(12) United States Patent
Yasuhara et al.

(10) Patent No.: US 8,863,368 B2
(45) Date of Patent: Oct. 21, 2014

(54) WINDING MEMBER MANUFACTURING METHOD, WINDING MEMBER MANUFACTURING APPARATUS, WINDING MEMBER PERIPHERAL LENGTH MEASURING APPARATUS AND PRE-TENSION APPLYING APPARATUS

(75) Inventors: Shinji Yasuhara, Yamatokoriyama (JP); Shinji Yamane, Nara (JP)

(73) Assignee: Jtekt Corporation, Osaka-Shi, Osaka (JP)

( * ) Notice: Subject to any disclaimer, the term of this patent is extended or adjusted under 35 U.S.C. 154(b) by 1085 days.

(21) Appl. No.: 12/312,044

(22) PCT Filed: Oct. 25, 2007

(86) PCT No.: PCT/JP2007/070800
§ 371 (c)(1),
(2), (4) Date: Apr. 23, 2009

(87) PCT Pub. No.: WO2008/053773
PCT Pub. Date: May 8, 2008

(65) Prior Publication Data
US 2010/0071191 A1     Mar. 25, 2010

(30) Foreign Application Priority Data

Oct. 31, 2006 (JP) ................. P2006-295180
Feb. 26, 2007 (JP) ................. P2007-045245

(51) Int. Cl.
| | |
|---|---|
| *F16H 55/56* | (2006.01) |
| *G01L 5/04* | (2006.01) |
| *F16H 9/12* | (2006.01) |
| *G01M 13/02* | (2006.01) |
| *B21L 15/00* | (2006.01) |
| *F16G 5/18* | (2006.01) |
| *G01L 5/10* | (2006.01) |

(52) U.S. Cl.
CPC ... *F16G 5/18* (2013.01); *G01L 5/04* (2013.01); *F16H 9/125* (2013.01); *G01M 13/023* (2013.01); *B21L 15/005* (2013.01); *B21L 15/00* (2013.01); *G01L 5/10* (2013.01)
USPC ............................................. 29/446; 474/8

(58) Field of Classification Search
CPC ........ B21L 15/00; B21L 15/005; F16H 9/125; G01M 13/023
USPC ........................................... 474/8, 201; 29/446
See application file for complete search history.

(56) References Cited

U.S. PATENT DOCUMENTS 1,255,912 A * 2/1918 Morse ............................ 59/29
1,966,831 A * 7/1934 Oakes et al. .................. 474/40

(Continued)

FOREIGN PATENT DOCUMENTS

| JP | 63-251655 | 10/1988 |
|---|---|---|
| JP | 2005-233275 | 9/2005 |

(Continued)

OTHER PUBLICATIONS

Notification of Reason(s) for Refusal dated Jan. 30, 2012, with English translation.

*Primary Examiner* — Jacob Cigna
(74) *Attorney, Agent, or Firm* — McGinn IP Law Group, PLLC

(57) ABSTRACT

[Problems] To provide power transmission chain manufacturing method and apparatus which can prevent a pin against damage when, by increasing a pre-tension, a more proper residual compression stress is applied to a link.
[Means for Solving Problems] The manufacturing apparatus comprises a pre-tension applying apparatus 31 which includes a first pre-tension applying pulley 32 and a second pre-tension applying pulley 33 around which an endless shaped chain 1 can be wound. The mutually opposed sheave surfaces 32a and 33a of the pre-tension applying pulleys 32 and 33 are respectively formed to have a concave shape which corresponds to the convex curved portion 14a of the end face of a pin 14.

19 Claims, 8 Drawing Sheets

(56) References Cited

U.S. PATENT DOCUMENTS

| | | | | |
|---|---|---|---|---|
| 3,016,755 | A | * | 1/1962 | Dittrich .............................. 474/8 |
| 4,143,558 | A | * | 3/1979 | Van Deursen et al. .......... 474/28 |
| 4,276,041 | A | * | 6/1981 | Steuer ........................... 474/243 |
| 4,579,550 | A | * | 4/1986 | Walker ......................... 474/242 |
| 4,631,042 | A | * | 12/1986 | Rattunde .......................... 474/8 |
| 4,790,799 | A | * | 12/1988 | Sadler ........................... 474/268 |
| 4,795,406 | A | * | 1/1989 | Dittrich et al. .................... 474/8 |
| 5,328,412 | A | * | 7/1994 | Durum .............................. 474/8 |
| 5,728,021 | A | * | 3/1998 | van Rooij et al. ............. 474/229 |
| 5,792,013 | A | * | 8/1998 | Heinrich et al. .................. 474/8 |
| 6,206,796 | B1 | * | 3/2001 | Lee ................................. 474/84 |
| 6,416,433 | B1 | * | 7/2002 | Linnenbrugger ................ 474/8 |
| 6,478,704 | B1 | * | 11/2002 | Greiter ........................... 474/229 |
| 6,926,631 | B2 | * | 8/2005 | Brandsma et al. ................ 474/8 |
| 7,942,766 | B2 | * | 5/2011 | van Rooij et al. ................. 474/8 |
| 2003/0144097 | A1 | * | 7/2003 | Brandsma et al. ................ 474/8 |
| 2007/0191157 | A1 | | 8/2007 | Kamamoto et al. |
| 2007/0232431 | A1 | * | 10/2007 | Kamamoto et al. .......... 474/245 |

FOREIGN PATENT DOCUMENTS

| | | | |
|---|---|---|---|
| JP | 2005233275 A | * | 9/2005 |
| JP | 2006-102784 | | 4/2006 |
| JP | 2006-214508 | | 8/2006 |
| JP | 2007108113 A | * | 4/2007 |
| JP | 2007-211914 | | 8/2007 |

* cited by examiner

T1  T2                              T3  T4

U.S. Patent Application No. 12/312,044
Group Art No.3726
Replacement Sheet

WINDING MEMBER MANUFACTURING METHOD, WINDING MEMBER MANUFACTURING APPARATUS, WINDING MEMBER PERIPHERAL LENGTH MEASURING APPARATUS AND PRE-TENSION APPLYING APPARATUS

TECHNICAL FIELD

The present invention relates to a method and an apparatus for manufacturing a winding member such as a power transmission chain and a belt and, more specifically, it relates to a method and an apparatus for manufacturing a power transmission chain suitable for use in a continuously variable transmission (CVT) for a vehicle such as a car. Also, the invention relates to an apparatus for measuring the peripheral length of a winding member such as a power transmission chain and a belt, and it also relates to a pre-tension apply apparatus including such peripheral length measuring apparatus.

BACKGROUND ART

As a continuously variable transmission for a car, as shown in FIG. 11, there is known a transmission (a chain type continuously variable transmission) which comprises: a drive pulley (2) disposed on the engine side and including a fixed sheave (2a) and a movable sheave (2b); a driven pulley (3) disposed on the drive wheel side and including a fixed sheave (3b) and a movable sheave (3a); and, an endless shaped power transmission chain (1) wound around the drive and driven pulleys, wherein the movable sheaves (2b) and (3a) are made to move toward and away from the fixed sheaves (2a) and (3b) using an oil pressure actuator to thereby clamp the chain (1) with the oil pressure of the actuator, and this clamping force is used to generate a contact load between the pulleys (2), (3) and chain (1), whereby torque is transmitted due to a frictional force generated between the contact portions of the pulleys and chain.

As a power transmission chain which is one of winding members for use in a continuously variable transmission, in the patent reference 1, there is proposed a power transmission chain which includes: a plurality of links each including front and rear insertion portions through which pins are inserted; and, a plurality of first and second pins for connecting the links adjoining each other in the width direction of the chain so as to be bent in the longitudinal direction thereof and also that the front insertion portion of one link and the rear insertion portion of the other link can correspond to each other, wherein the first pin fixed to the front insertion portion of one link and movably fitted with the rear insertion portion of the other link and the second pin movably fitted with the front insertion portion of one link and fixed to the rear insertion portion of the other link are moved relative to each other in a rolling contact manner, whereby the two links can be bent in the longitudinal direction thereof.

In this type of power transmission chain, in order to enhance the durability of the chain, in the manufacturing process thereof, a tension is previously applied to the chain (application of a pre-tension) to thereby apply a proper residual compression stress to the link.

Also, in this type of continuously variable transmission, it is necessary to know the peripheral length of the chain with high precision. Specifically, the conical shape of the pulley is measured to estimate a contact diameter D, and there is obtained the peripheral length=πD+2L using a center distance L between the pulleys.

However, as regards the contact diameter D used in the above calculation of the peripheral length, since the contact ellipse area between the pin and pulley has a width in the diameter direction, the calculation of the peripheral length using the center value of the contact ellipse area finds it difficult to obtain sufficient measuring precision. This problem is found not only in the chain type continuously variable transmission disclosed in the patent reference 2 but also in a belt type continuously variable transmission.

Patent Reference 1: Japanese Patent Publication JP 2006-102784A
Patent Reference 2: Japanese Patent Publication JP 2005-233275A

DISCLOSURE OF THE INVENTION

Problems that the Invention Solves

In the conventional pre-tension applying apparatus, while aiming at adapting the apparatus to a continuously variable transmission in which the apparatus is used (actual transmission), the mutually opposed sheave surfaces of the pre-tension applying pulleys are formed as conical surfaces (the shape of the section thereof is a straight line). To apply a proper residual compression stress to the link using a pre-tension applying apparatus, preferably, the pre-tension may be set at a given value or higher. However, since the end face of the pin is formed as a convex curved portion, when a large pre-tension is applied, there is a possibility that the pin end face can be damaged.

Thus, it is an object of the invention to provide a method and an apparatus for manufacturing a winding member capable of preventing a pin against damage when a pre-tension is increased and a more proper residual compression stress is applied to a link. Also, it is another object of the invention to provide a continuously variable transmission winding member peripheral length measuring apparatus which can determine simply and accurately the peripheral length of a winding member such as a chain and a belt for use in a continuously variable transmission, and a pre-tension applying apparatus including such peripheral length measuring apparatus.

Means for Solving the Problems

According to a first aspect of the invention, there is provided a winding member manufacturing method, in which a winding member provided with a plurality of links and a plurality of pins for connecting the links and wound around two pulleys is manufactured. Specifically, this manufacturing method comprises the step of winding an endless shaped chain around a first pre-tension applying pulley and a second pre-tension applying pulley and applying a pre-tension to the chain. In the present manufacturing method, mutually opposed sheave surfaces of each of the pre-tension applying pulleys are formed to have a concave shape corresponding to the convex curved portion of the end face of the pin.

According to the invention, there is provided an apparatus for manufacturing a winding member provided with a plurality of links and a plurality of pins for connecting the links and wound around two pulleys. Specifically, the present apparatus comprises a pre-tension applying apparatus including a first pre-tension applying pulley and a second pre-tension applying pulley around which an endless shaped chain can be wound. Also, in the present apparatus the mutually opposed sheave surfaces of each of the pre-tension applying pulleys are respectively formed to have a concave shape corresponding to the convex curved portion of the end face of the pin.

Conventionally, in the case of a pulley which is used when applying a pre-tension, the sectional shapes of the mutually opposed conical shaped sheave surfaces of the pulley are respectively formed as a straight line or a convex curved surface. On the other hand, according to the invention, while taking it into consideration that the end face of the pin is formed to have a convex curved portion, the above sectional shape is formed as a concave curved surface. This increases the contact area between the convex curved portion of the end face of the pin and the concave curved portion of the pulley. This reduces the contact surface pressure acting on the pin and thus, even when a large pre-tension is applied, the pin can be prevented against damage. The convex curved portion of the pin end face can be formed to have various shapes; for example, it can be formed as a spherical surface, or it can be formed according to a crowning working operation. The concave curved portion of the pulley may be a concave shape (the section of the contact area thereof with the convex curved portion of the pin may be larger than the conical surface of a straight line), and it need not be the same as the convex curved portion of the pin end face. The radius of curvature R of the concave curved portion of the pulley may preferably be set such that $0.8r \leq R \leq 5r$, where r expresses the radius of curvature of the convex curved portion of the end face of the pin. When R is smaller than 0.8r, it is difficult to secure a necessary contact surface for the pulley; and, when R is larger than 5r, the amount of an increase in the contact area is small, thereby reducing the pin damage preventive effect. The radius of curvature R of the concave curved portion of the pulley, more preferably, may be set such that $r \leq R \leq 2r$.

A winding member manufactured by the manufacturing method and apparatus according to the invention is suitable for use in a continuously variable transmission which changes the winding diameter of the winding member continuously according to variations in the distance between the sheaves of the respective pulleys to thereby change gears continuously.

The pre-tension applying apparatus, which is used to apply a pre-tension to the chain, can be formed to simulate a continuously variable transmission (a transmission in which the present pre-tension applying apparatus is used) except for the shape of the sheave surfaces of the pulleys. For example, the pre-tension applying apparatus may comprise a first pulley including a fixed sheave and a movable sheave each having a conical surface shaped sheave surface, and a second pulley including a fixed sheave and a movable sheave each having a conical surface shaped sheave surface, in which, by moving the movable sheave toward and away from the fixed sheave, the winding member can be clamped. However, the pre-tension applying apparatus may not be formed to simulate a continuously variable transmission in which the apparatus is used. For example, the movable sheaves of the respective pulleys may be fixed. The pre-tension applying apparatus may comprise: a first pulley including a pair of fixed sheaves each having a conical surface shaped sheave surface and opposed to each other at a first interval; and, a second pulley including a pair of fixed sheaves each having a conical surface shaped sheave surface and opposed to each other at a second interval, in which, by rotationally driving the pulleys to increase and decrease the center distance between the first and second pulleys, a tensile force may be applied to the winding member.

In the pre-tension applying time, preferably, the diameter of at least one of the pulleys may be equal to or smaller than the actual minimum diameter. In a continuously variable transmission, a gear ratio varies between an under drive (which is hereinafter referred to as "U/D"), in which a gear ratio corresponding to the low speed running time is maximum, and an over drive (which is hereinafter referred to as "O/D") in which a gear ratio corresponding to the high speed running time is minimum. The amplitude of stress acting on the link according to the movement of the link becomes larger when the chain rotates along the pulley having a small winding diameter than when the chain rotates along the pulley having a large winding diameter. Thus, when the winding diameter in the pre-tension applying time is set so as to contain the minimum winding diameter obtained in a continuously variable transmission or less, it is possible to apply uniform stress to the link over the wide range thereof, thereby being able to extend the link uniformly. In this case, the winding diameter in the pre-tension applying time may be varied continuously or may be constant; and, the winding diameter of one of the first and second pre-tension applying pulleys may be set temporarily or normally equal to or smaller than the minimum winding diameter that can be obtained in the continuously variable transmission.

The pre-tension may preferably be twice or more (twice to three times) the maximum tension that is applied when the pre-tension applying apparatus is used in a continuously variable transmission. When the continuously variable transmission is used in a car, the pre-tension may be twice or more (twice to three times) a tension obtained when the nominal torque of the car is applied. This makes it possible to apply a proper residual compression stress to the link.

The winding member may be, for example, a power transmission chain, comprising: a plurality of links respectively including front and rear insertion portions through which pins are inserted; and, a plurality of first and second pins respectively arranged forward and backward for connecting the links arranged in the chain width direction in such a manner that the front insertion portion of one link and the rear insertion portion of the other link correspond to each other, in which, when the first and second pins are moved relative to each other in a rolling contact manner, the links can be bent in the longitudinal direction thereof; one of the first and second pins is fixed to the front insertion portion of one link and is also movably fitted with the rear insertion portion of the other link; and, the other is movably inserted into the front insertion portion of one link and is also fixed to the rear insertion portion of the other link.

The above-mentioned manufacturing method and apparatus are suitable for manufacturing various power transmission chains each serving as a winding member. They are more suitable for manufacturing a power transmission chain having the following structure. That is, the chain comprises: a plurality of links each having front and rear insertion portions through which a pin can be inserted; and, a plurality of first and second pins respectively arranged forward and backward for connecting the links arranged in the chain width direction in such a manner that the front insertion portion of one link and the rear insertion portion of the other link correspond to each other, in which, when the first and second pins are moved relative to each other in a rolling contact manner, the links can be bent in the longitudinal direction thereof, one of the first and second pins is fixed to the front insertion portion of one link and is also movably fitted with the rear insertion portion of the other link, and the other is movably fitted with the front insertion portion of one link and is also fixed to the rear insertion portion of the other link.

In this power transmission chain, at least one of the first and second pins is contacted with pulleys to transmit power due to the frictional force caused between them. In a chain structured such that one of the pins can be contacted with the pulleys, one of the first and second pins serves as a pin which is to be contacted with the pulleys when this chain is used in a continuously variable transmission (which is hereinafter referred to as a first pin or a pin), and the other serves as a pin which is not to be contacted with the pulleys (which is generally referred to as an inter-piece or a strip, and which is hereinafter referred to as a second pin or an inter-piece).

The link is made of, for example, spring steel or carbon tool steel. However, the material of the link is not limited to spring steel or carbon tool steel, but it may also be other steel such as bearing steel. The front and rear insertion portions of the link may be penetration holes independent of each other (in this case, the link is called a link with a pillar), or the front and rear insertion portions may also be formed as a penetration hole (a link with no pillar). As the material of the pin, there is used proper steel such as bearing steel.

When the pin is fixed to the front and rear insertion portions of the link, the fixation of the pin to the front and rear insertion portions can be carried out, for example, according to the fitting fixation between the inner edges of the insertion portions and the outer peripheral surface of the pin due to the mechanical pressure insertion of the pin. Alternatively, instead of this, they may also be fixed together by shrinkage fit or by expansion fit. With one insertion portion, there are fitted the first and second pins in such a manner that they are opposed to each other in the chain longitudinal direction, and one of the pins is fitted and fixed to the peripheral surface of the insertion portion of the link. The fitting fixation may preferably be carried out on the edges (upper and lower edges) of a portion perpendicular to the longitudinal direction of the insertion portion. After execution of this fitting fixation, as a pre-tension is applied in the above-mentioned pre-tension applying step, a uniform and proper residual compression stress is applied to the pin fixed portion of the link (pin pressure insertion portion) with high precision.

According to a second aspect of the invention, there is provided a peripheral length measuring apparatus. This is an apparatus which is used to measure the peripheral length of a winding member to be wound around pulleys in a continuously variable transmission. Specifically, this apparatus comprises: a pair of sensors disposed to face the linear portion of the winding member and spaced from each other by a given distance L; a portion to be detected formed in a given portion of the winding member corresponding to the sensors; a first operating unit, according to the outputs of the paired sensors, for calculating a time Ta necessary for the portion to be detected to move by the given distance L; and, a second operating unit, according to the outputs of the paired sensors, for calculating a time Tb necessary for the portion to be detected to go around the pulleys, wherein the peripheral length of the winding member can be obtained according to an equation, that is, L×Tb/Ta.

The sensor may be a displacement sensor or a rotation sensor. The portion to be detected can be obtained, for example, by bonding a projection-shaped marker at the desired position of the winding member; or, a minute uneven portion existing in the winding member can also be used as the portion to be detected.

According to a third aspect of the invention, there is provided a pre-tension applying apparatus. This is an apparatus used to apply a pre-tension to a winding member which is used in a continuously variable transmission in such a manner that it is wound around pulleys. Specifically, the present apparatus comprises: first and second pre-tension applying pulleys around which an endless shaped winding member can be wound; a rotation drive unit for rotating the rotation shaft of one of the pulleys; a longitudinal direction drive unit for increasing the center distance between the first and second pulleys; and, a peripheral length measuring apparatus for measuring the peripheral length of the winding member after the pre-tension is applied.

ADVANTAGE OF THE INVENTION

Conventionally, the mutually opposed sheave surfaces of the respective pre-tension applying pulleys are each formed as a conical surface in order to correspond to a continuously variable transmission to which they are applied. On the other hand, according to the winding member manufacturing method and apparatus of the invention, the sheave surfaces are formed to have a concave shape so as to correspond to the convex curved portion of the end face of the pin. Therefore, even when there is applied a pre-tension greater than a pre-tension which is applied in the continuously variable transmission, the pin end face can be prevented against damage, thereby being able to enhance the durability of the winding member.

According to the continuously variable transmission winding member peripheral length measuring apparatus of the invention, the peripheral length of a winding member such as a chain and a belt used in a continuously variable transmission can be determined simply and with high precision. When the present apparatus is added to a pre-tension applying apparatus, it is possible to obtain the peripheral length of the winding member without carrying out a peripheral length measuring step separately.

BEST MODE FOR CARRYING OUT THE INVENTION

Figure 1:
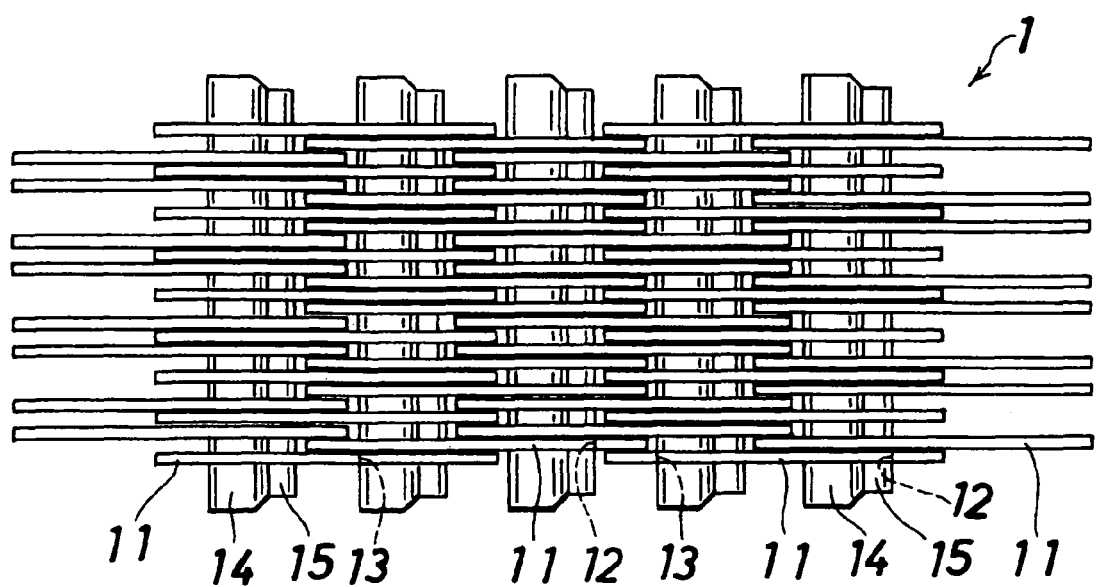
FIG. 1 is a plan view of a portion of an embodiment of a power transmission chain to be manufactured according to the power transmission chain manufacturing method of the invention.

Now, description will be given below of embodiments according to the invention with reference to the accompanying drawings. In the following description, the terms "upward" and "downward" mean "upward" and "downward" in FIGS. 3A and 3B. Also, in the respective embodiments and modifications of the invention, the same or corresponding parts are given common reference numerals and the duplicate description thereof is omitted.

Figure 2:
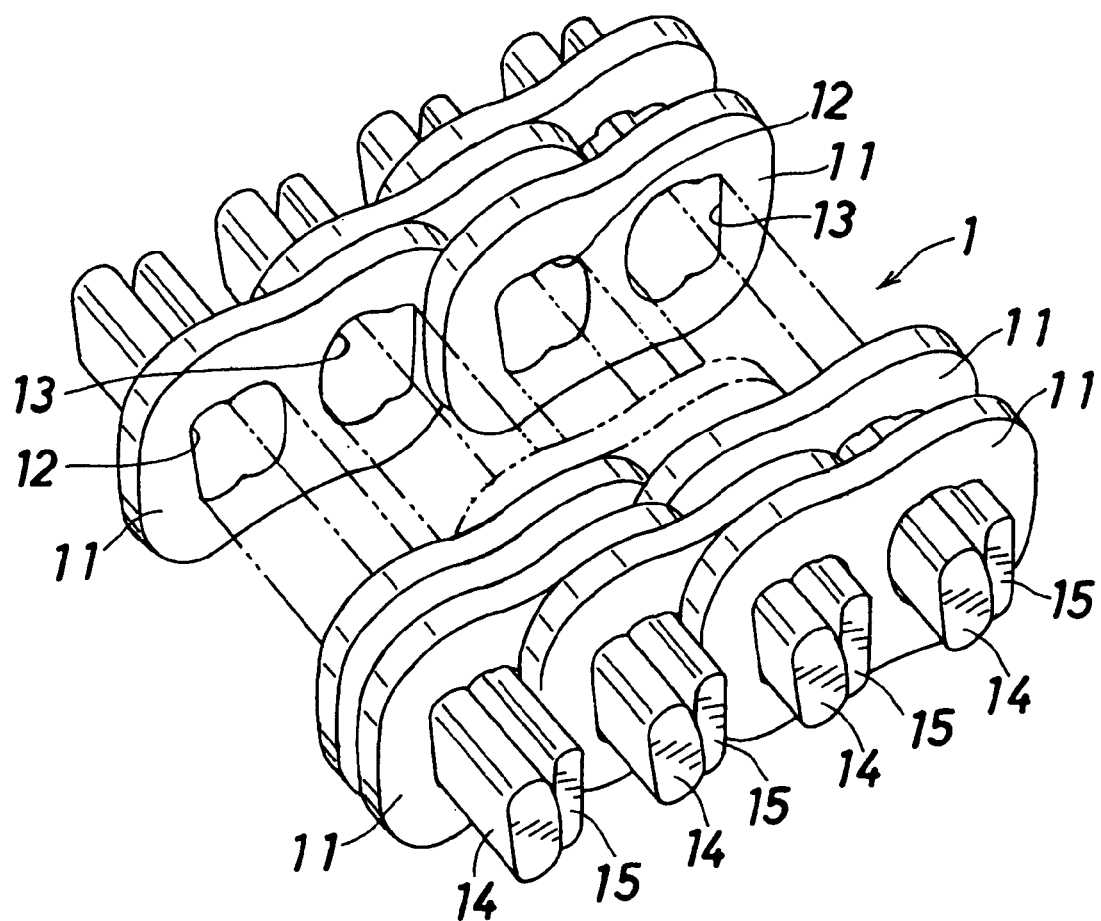
FIG. 2 is an enlarged perspective view of the above power transmission chain.

FIGS. 1 and 2 respectively show a portion of a power transmission chain serving as a winding member which is manufactured according to a winding member manufacturing method according to the invention. The power transmission chain (1) includes a plurality of links (11) each having front and rear insertion portions (12) (13) formed at given intervals in the longitudinal direction of the chain, and a plurality of pins (first pins) (14) and inter-pieces (second pins) (15) for connecting the links (11) adjoining each other in the width direction of the chain so that the links (11) can be bent in the longitudinal direction thereof.

Figure 3A:
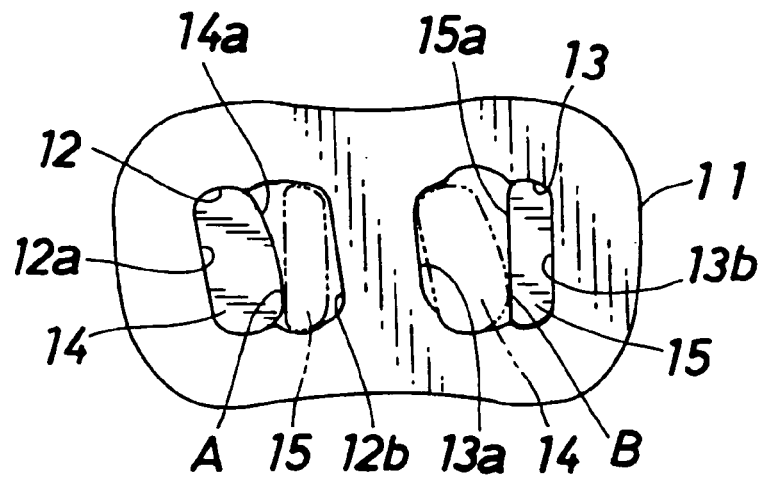
FIG. 3A is an enlarged side view of a link.

As shown in FIG. 3A, the front insertion portion (12) includes a fixing portion (12a) to which the pin (14) (shown by a solid line) can be fixed, and an inter-piece movable portion (12b) with which the inter-piece (15) (shown by a two-dot chained line) can be movably fitted. Also, the rear insertion portion (13) includes a pin movable portion (13a) with which the pin (14) (shown by a two-dot chained line) can be movably fitted, and an inter-piece fixing portion (13b) to which the inter-piece (15) (shown by a solid line) can be fixed. And, when connecting the links (11) arranged in the chain width direction, the links (11) are overlapped with each other in such a manner that the front insertion portion (12) of one link (11) and the rear insertion portion (13) of the other link (11) correspond to each other; the pin (14) is fixed to the front insertion portion (12) of one link (11) and is movably fitted with the rear insertion portion (13) of the other link (11); and, the inter-piece (15) is movably fitted with the front insertion portion (12) of one link (11) and is fixed to the rear insertion portion (13) of the other link. The pin (14) and inter-piece (15) are moved relative to each other in a rolling contact manner, whereby the links (11) can be bent in the longitudinal direction (in the fore and aft direction) thereof.

A locus formed by the contact positions between the pin (14) and inter-piece (15) with the pin (14) as the reference is formed as an involute curve. In the present embodiment, the contact surface (14a) of the pin (14) is formed as an involute shape the section of which has a base circle of a radius Rb and a center M; and, the contact surface (15a) of the inter-piece (15) is formed as a flat surface (the sectional shape thereof is a straight line). Owing to this, when the respective links (11) move from the linear-shaped portion of the chain (1) to the arc-shaped portion thereof or from the arc-shaped portion to the linear-shaped portion, in the front insertion portion (12), the inter-piece (15) moves within the inter-piece movable portion (12b) relative to the fixed pin (14) while the contact surface (15a) thereof is in rolling contact (including a slight amount of sliding contact) with the contact surface (14a) of the pin (14); and, in the rear insertion portion (13), the pin (14) moves within the pin movable portion (13a) relative to the fixed inter-piece (15) while the contact surface (14a) thereof is in rolling contact (including a slight amount of sliding contact) with the contact surface (15a) of the inter-piece (15). Here, in FIG. 3A, portions, which are designated by reference signs A and B, are lines (in the case of the sections thereof, dots) where the pin (14) and inter-piece (15) are contacted with each other in the linear-shaped portion of the chain (1); and, the distance between A and B is a pitch.

The chain (1) is structured in the following manner. That is, two or more links in phase with each other in the chain width direction are combined together to constitute a link row, three link rows are arranged in the chain advancing direction (in the back and forth direction) to constitute a link unit, and two or more link units each composed of the three link rows are connected together in the chain advancing direction to thereby constitute the chain (1). According to this embodiment, a link row composed of 9 links and a link row composed of 8 links are combined together to constitute a link unit.

Figure 4:
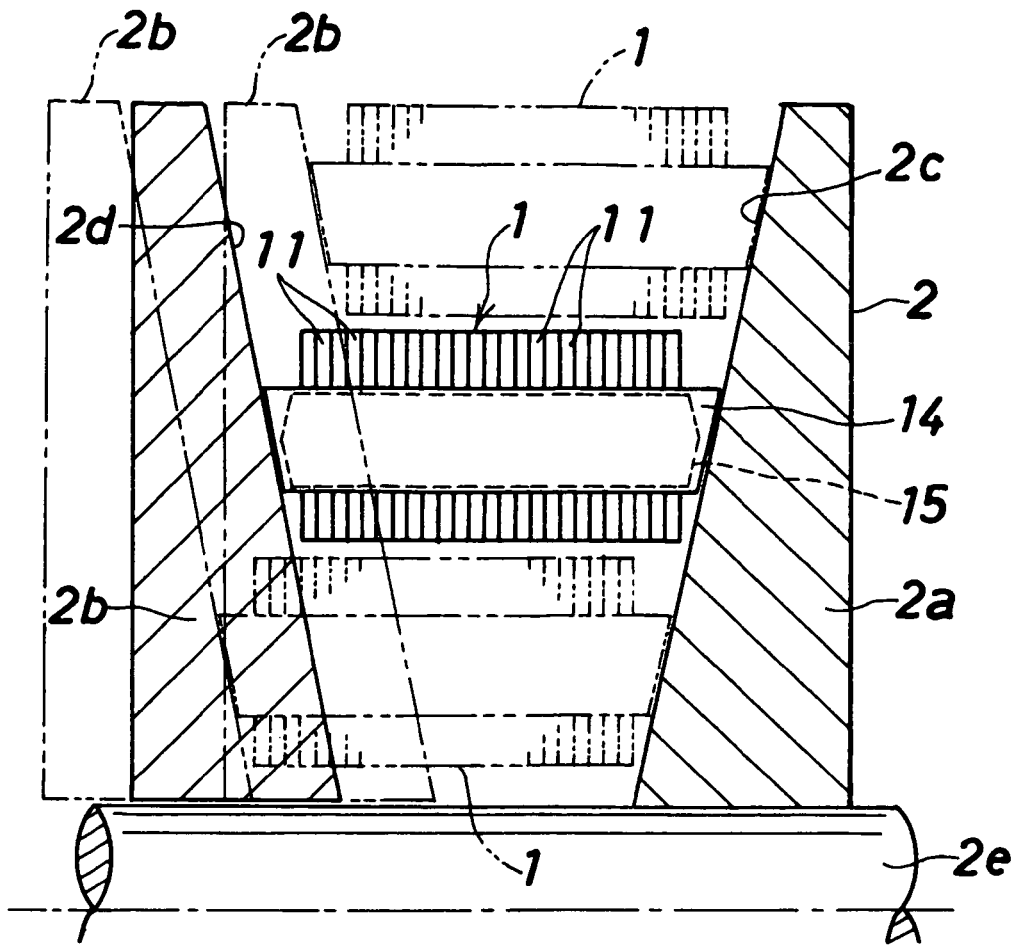
FIG. 4 is a front view of the power transmission chain, showing a state where it is mounted on pulleys.

This power transmission chain (1) is used in a V-model pulley-type CVT shown in FIG. 4. In this case, for example, the inter-piece (second pin) is formed shorter than the pin (first pin); in a state where the end face of the inter-piece (15) is not in contact with the respective conical shaped sheave surfaces (2c), (2d) of the fixed sheave (2a) and movable sheave (2b) of the pulley (2), the end face of the pin (14) is contacted with the conical shaped sheave surfaces (2c), (2d) of the pulley (2) having a pulley shaft (2e); and, the power can be transmitted using a frictional force generated by such contact. The shape of the end face of the pin (14) to be contacted with the conical shaped sheave surfaces (2c), (2d) of the pulley (2) is formed as a convex curved shape. Since the pin (14) and inter-piece (15), as described above, move relatively in rolling contact with each other, the pin (14) hardly rotates relative to the sheave surfaces (2c), (2d) of the pulley (2), which reduces the loss of friction between them, thereby being able to secure the high mechanical efficiency of power transmission.

Figure 5:
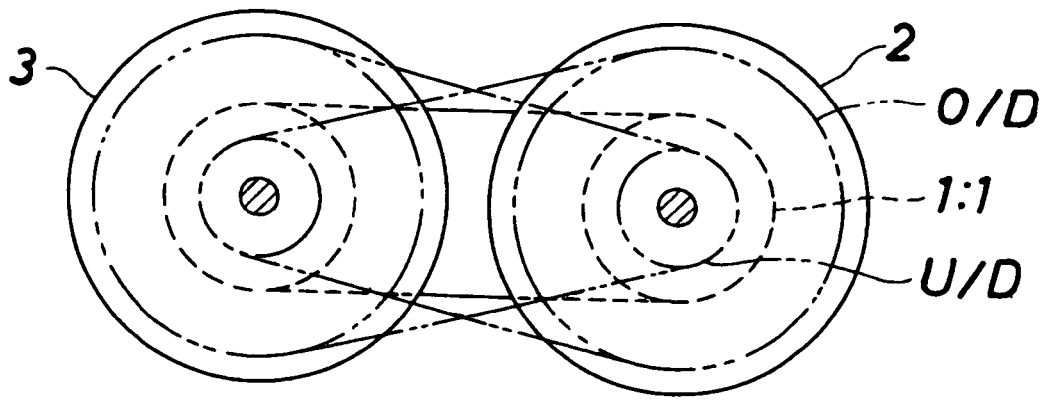
FIG. 5 is a typical side view of the power transmission chain, showing a state where it changes as the continuously variable transmission changes gears.

In FIG. 4, when the movable sheave (2b) of the drive pulley (2) situated at a position shown by a solid line is made to approach and part away from the fixed sheave (2a), the winding diameter of the chain (1), as shown by a chained line in FIG. 4, increases when it approaches and, it decreases when it parts away. As regards a driven pulley (3) (not shown in FIG. 4), the movable sheave thereof moves in the opposite direction to the movable sheave (2b) of the drive pulley (2); when the winding diameter of the drive pulley (2) increases, the winding diameter of the driven pulley (3) decreases; and, when the winding diameter of the drive pulley (2) decreases, the winding diameter of the driven pulley (3) increases. As a result of this, as shown in FIG. 5, while a state of a gear ratio of 1:1 (an initial value) is regarded as a reference, there can be obtained a U/D state where the winding diameter of the drive pulley (2) is a minimum and the winding diameter of the driven pulley (3) is a maximum; and also, there can obtained an O/D state where the winding diameter of the drive pulley (2) is a maximum and the winding diameter of the driven pulley (3) is a minimum.

Figure 3B:
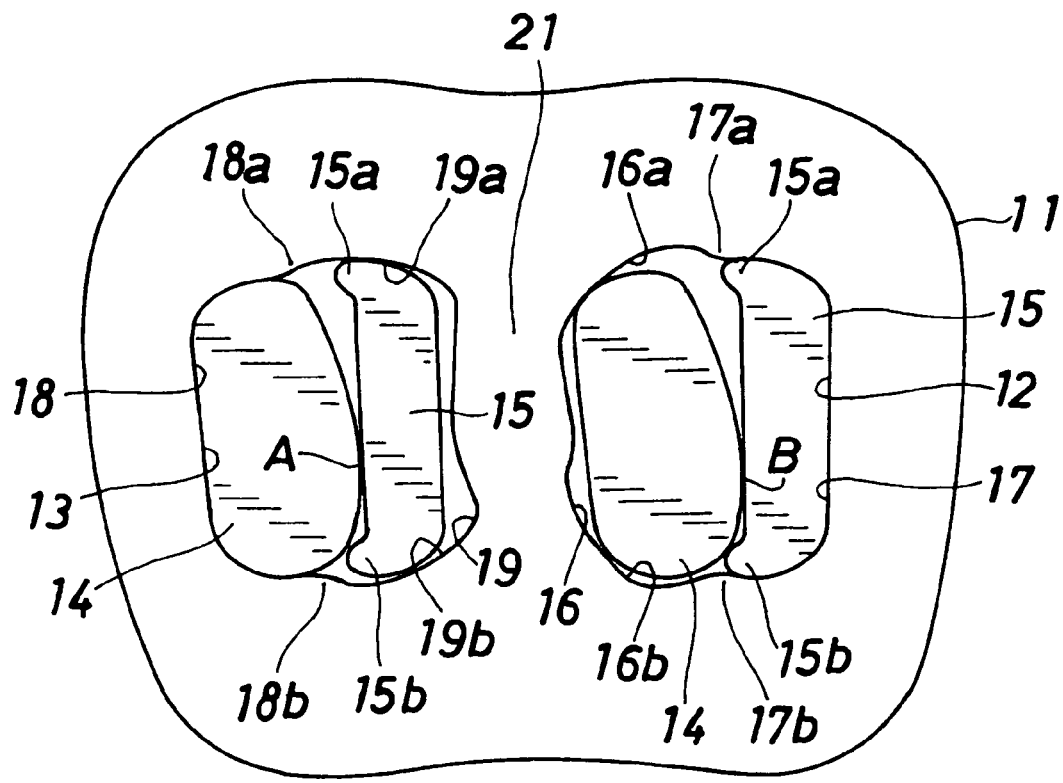
FIG. 3B is an enlarged side view of a modification of the link.

Also, FIG. 3B shows a modification of the power transmission chain (1). As shown in FIG. 3B, similarly to the embodiment shown in FIG. 3A, in this modified power transmission chain (1), between the front and rear insertion portions (12) and (13) of the link (11), there is interposed a pillar portion (21); the front insertion portion (12) includes a pin movable portion (16) with which the pin (14) can be movably fitted, and an inter-piece fixing portion (17) to which the inter-piece (15) can be fixed; and, the rear insertion portion (13) includes a pin fixing portion (18) to which the pin (14) can be fixed, and an inter-piece movable portion (19) with which the inter-piece (15) can be movably fitted.

In the modification shown in FIG. 3B, the respective pins (14) are formed larger in width in the back and forth direction thereof than the inter-pieces (15) and, in the upward and downward edge portions of the inter-pieces (15), there are provided projecting edge portions (15a), (15b) extending on the pins (14) side thereof.

In FIG. 3B, portions respectively designated by signs A and B are lines (their sections are dots) where the pins (14) and inter-pieces (15) are contacted with each other in the linear shaped portion of the chain (1); and, the distance between the lines A and B is a pitch.

When connecting the links (11) arranged in the chain width direction, the links (11) are overlapped with each other in such a manner that the front insertion portion (12) of one link (11) and the rear insertion portion (13) of the other link (11) correspond to each other; the pin (14) is fixed to the rear insertion portion (13) of one link (11) and is movably fitted with the front insertion portion (12) of the other link (11); and, the inter-piece (15) is movably fitted with the rear insertion portion (13) of one link (11) and is fixed to the front insertion portion (12) of the other link. The pin (14) and inter-piece (15) are moved relative to each other in a rolling contact manner, whereby the links (11) can be bent in the longitudinal direction (in the back and forth direction) thereof.

In the boundary portion between the pin fixing portion (18) and inter-piece movable portion (19) of the link (11), there are formed upper and lower projecting arc-shaped hold portions (18a) and (18b) which are respectively continuous with the upper and lower recessed arc-shaped guide portions (19a) and (19b) of the inter-piece movable portion (19) and are used to hold the pin (14) fixed to the pin fixing portion (18). Similarly, in the boundary portion between the inter-piece fixing portion (17) and pin movable portion (16), there are formed upper and lower projecting arc-shaped hold portions (17a) and (17b) which are respectively continuous with the upper and lower recessed arc-shaped guide portions (16a) and (16b) of the pin movable portion (16) and are used to hold the inter-piece (15) fixed to the inter-piece fixing portion (17).

Similarly to FIG. 3A, a locus formed by the contact positions between the pin (14) and inter-piece (15) with the pin (14) as the reference provides an involute curve and, in the present modification, the rolling contact surface of the pin (14) has an involute shape the section of which is a base circle having a radius Rb and a center M, while the rolling contact surface of the inter-piece (15) is formed as a flat surface (the section of which is a straight line). Owing to this, when the respective links (11) move from the linear shaped portion of the chain (1) to the curved portion thereof or from the curved portion to the linear shaped portion, in the front insertion portion (12), the pin (14) moves within the pin movable portion (16) relative to the fixed inter-piece (15) while the rolling contact surface thereof is in rolling contact (including a slight amount of sliding contact) with the inter-piece (15); and, in the rear insertion portion (13), the inter-piece (15) moves within the inter-piece movable portion (19) while the rolling contact surface thereof is in rolling contact (including a slight amount of sliding contact) with the rolling contact surface of the pin (14).

The power transmission chain (1) according to the present modification is used in the V-model pulley-type CVT shown in FIG. 4. In this case, in a state where the end face of the inter-piece (15) is not in contact with the respective conical shaped sheave surfaces (2c) and (2d) of the fixed sheave (2a) and movable sheave (2b) of the pulley (2) having a pulley shaft (2e), the end face of the pin (14) is contacted with the conical shaped sheave surfaces (2c) and (2d) of the pulley (2), whereby the power can be transmitted due to a frictional force generated by such contact.

Generally, the repetitive vertical movements of the pin generate polygonal vibrations, which cause noises. However, in the above-mentioned power transmission chain (1), the pin (14) and inter-piece (15) are relatively moved in rolling contact with each other, and the locus formed by the contact positions between the pin (14) and inter-piece (15) with the pin (14) as the reference is formed as an involute curve. Therefore, when compared with a structure in which the rolling contact surfaces of the pin and inter-piece are both formed as an arc-shaped surface, the vibrations and thus the noises can be reduced. When it is used in a CVT, since the pin (14) and inter-piece (15), as mentioned above, are relatively moved in rolling contact with each other, the pin (14) hardly rotates relative to the sheave surfaces (2c) and (2d) of the pulley (2), which can reduce the loss of friction between them and can secure the high mechanical efficiency of power transmission.

To manufacture the power transmission chains (1) respectively shown in FIGS. 3A and 3B, the necessary number of pins (14) and inter-pieces (15) may be vertically put and held on a support base and, after then, the links (11) may be pressure inserted one by one or collectively by a bunch of several links. This pressure insertion is carried out between the upper and lower edge portions of the pins (14) and inter-pieces (15) and the upper and lower edge portions of the pin fixing portions (12a) (in FIG. 3B, (18)) and inter-piece fixing portions (13b) (in FIG. 3B, (17)); and, the margin of the pressure insertion is set in the range of 0.005 mm~0.1 mm. In this manner, a pre-tension force is applied to the assembled chain (1).

Figure 6:
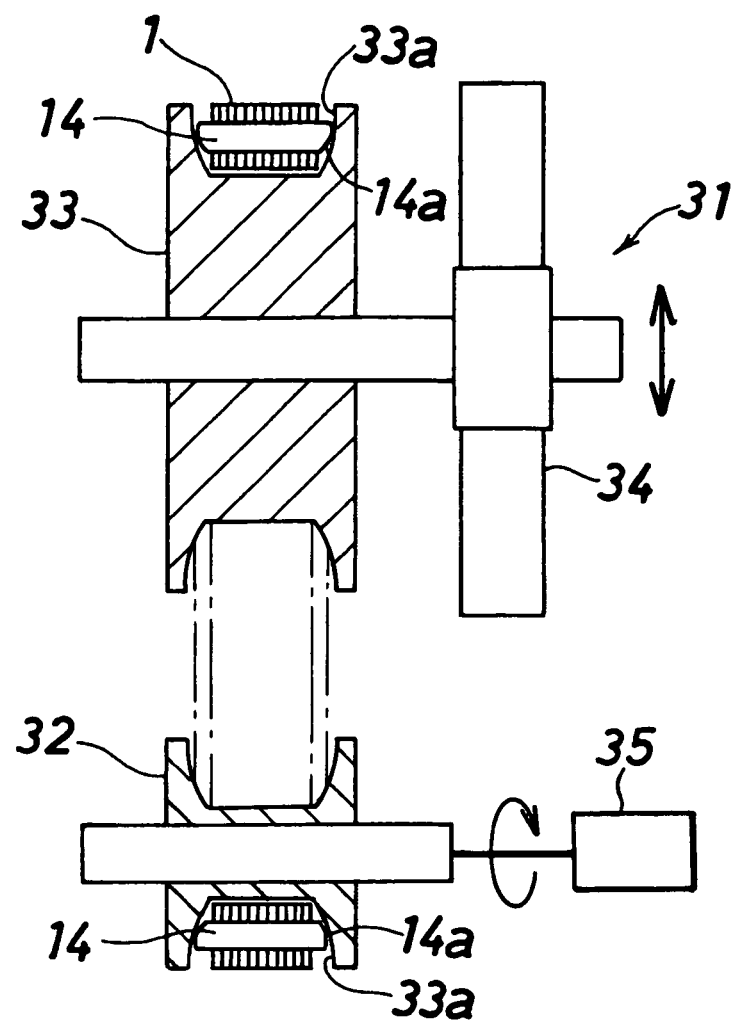
FIG. 6 is a typical view of a pre-tension applying apparatus.

FIG. 6 shows a pre-tension applying apparatus which is used in the manufacturing method and apparatus according to the invention.

The pre-tension applying apparatus (31) includes a small-diameter pulley (32) (which is also hereinafter referred to as a first pulley) the winding diameter of which is set at the minimum winding diameter that can be obtained in a continuously variable transmission, a large-diameter pulley (33) (which is also hereinafter referred to as a second pulley) the winding diameter of which is set at the maximum winding diameter that can be obtained in a continuously variable transmission, a pulley shaft moving device (34) for moving the pulleys (32) and (33) toward and away from each other to adjust a tensile force acting on the chain (1), and a rotation drive device (35) for rotating the pulleys (32) and (33).

Figure 7:
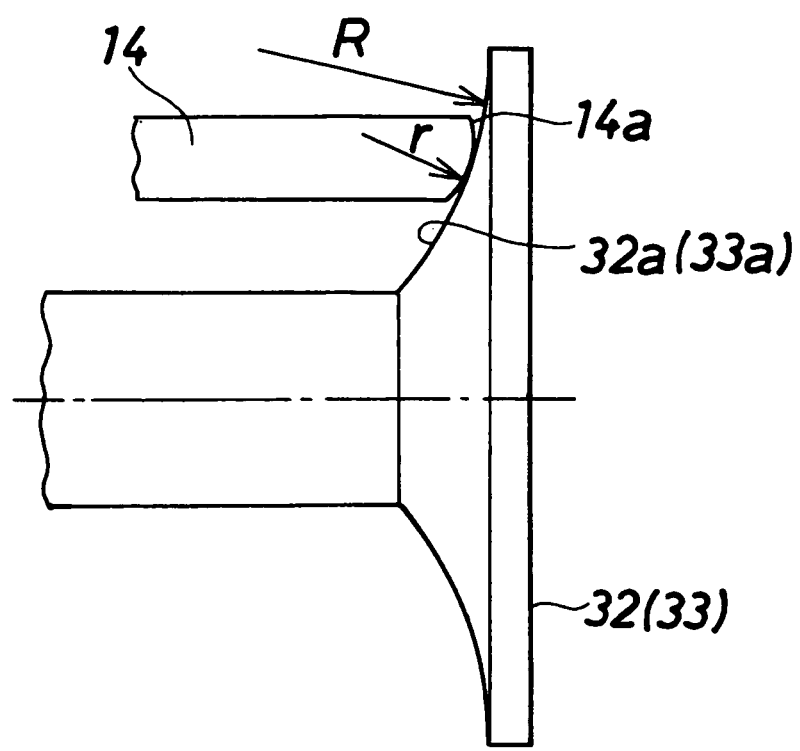
FIG. 7 is an enlarged view of the main portions of FIG. 6.

Conventionally, the mutually opposed sheave surfaces (32a) and (33a) of the respective pre-tension applying pulleys (32) and (33) of the pre-tension applying apparatus (31) are formed as, for example, conical surfaces in order to match them to a continuously variable transmission to which the apparatus is applied. However, according to the invention, as shown in an enlarged manner in FIG. 7, the sheave surfaces (32a) and (33a) are formed as concave curved surfaces which correspond to the projection-shaped curved portion (14a) of the end face of the pin (14). The radius of curvature R of the sheave surfaces (concave curved portions) (32a) and (33a) of the pulleys (32) and (32) is set such that $0.8r \leq R \leq 5r$ where r expresses the radius of curvature of the convex curved portion (14a) of the pin (14) end face.

The combination of the diameters of the small-diameter pulley (32) and large-diameter pulley (33) of the pre-tension applying apparatus (31) is the same as the U/D state (which is also the same as the O/D state), and the movements of the pin (14) and inter-piece (15) are large, which provides a severe condition to the chain (1); and also, the winding diameter in the pre-tension applying time is set so as to contain a diameter equal to or less than the minimum winding diameter that can be obtained in a continuously variable transmission. Therefore, a residual compression stress can be applied to the links (11) uniformly, thereby being able to enhance the durability of the chain (1).

The value of the pre-tension is set such that the value of the maximum main stress generated in the internal portion (especially, the pin fixing portion (12a) and inter-piece fixing portion (13b)) of the link (11) is equal to or more than the elastic limit value of the link (11) as well as equal to or less than the plastic limit value thereof. Owing to this, a proper residual compression stress can be applied to the interior portion of the link (11). In order to obtain a proper residual compression stress, it is necessary to apply a pre-tension larger than a tensile force which is applied in a continuously variable transmission to which the pre-tension applying apparatus (31) is applied. In this case, there is a possibility that the end face of the pin (14) can be damaged. However, when the shapes of the pulleys (32) and (33) in the pre-tension applying time are set in the above-mentioned manner, such damage of the pin (14) end face can be prevented.

Here, the pre-tension applying apparatus (31) according to the first embodiment includes a peripheral length measuring apparatus (41) which will be discussed in a second embodiment to be described later. That is, as will be discussed with reference to FIG. 9, in a state where the peripheral length measuring apparatus (41) is mounted on the pre-tension applying apparatus (31), simultaneously when applying a pre-tension, the peripheral length of the chain (1) can be measured.

Of course, the pre-tension applying apparatus (31) according to the first embodiment, as shown in FIG. 6, is also able to apply a pre-tension to the chain (1) by itself in a state where the peripheral length measuring apparatus (41) is not mounted thereon.

Second Embodiment

Figure 8:
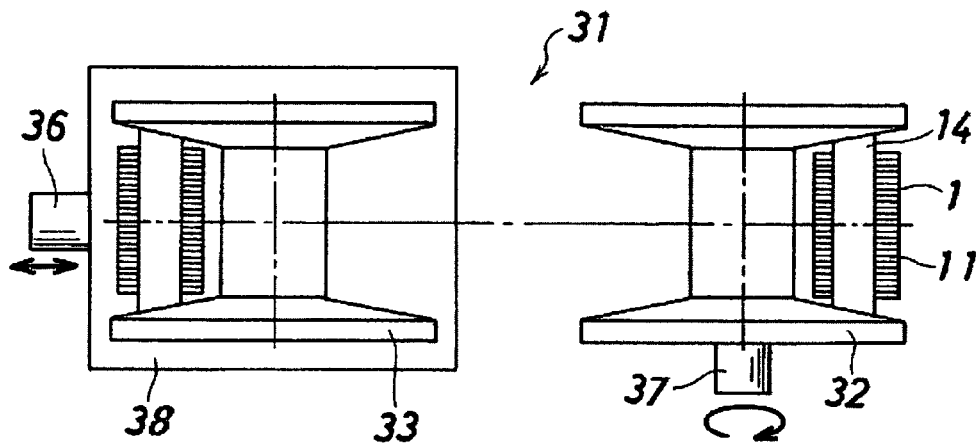
FIG. 8 is a typical view of a second embodiment of the pre-tension applying apparatus.
Figure 9:
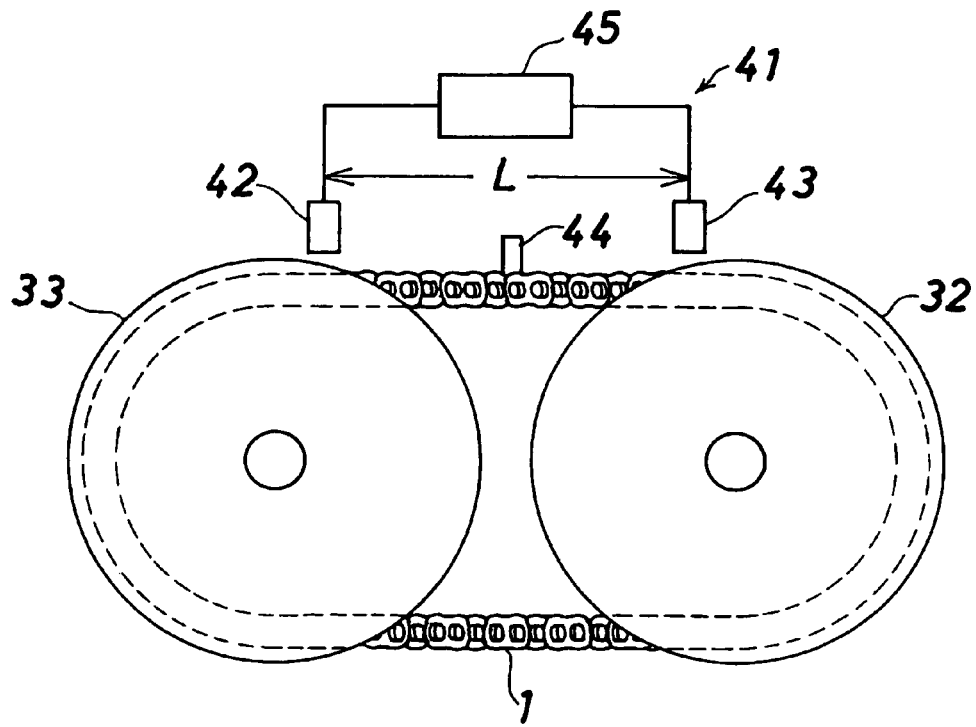
FIG. 9 is a typical view of a pre-tension applying apparatus including a second embodiment of a peripheral length measuring apparatus.

Now, FIGS. 8 and 9 respectively show a peripheral length measuring apparatus according to the second embodiment of the invention and a pre-tension applying apparatus including such peripheral length measuring apparatus.

The pre-tension applying apparatus (31) according to the second embodiment includes: a first pulley (32); a second pulley (33); a rotation drive device (37) for rotating the rotation shaft of the first pulley; a longitudinal-direction movable table (38), when driven by a longitudinal-direction drive device (36), for moving the second pulley (33) in the chain longitudinal direction to increase and decrease the center distance between the pulleys (32) and (33) to thereby adjust a tensile force acting on the chain (1); and, a peripheral length measuring apparatus (41) for measuring the peripheral length of the chain (winding member) (1).

The winding diameters of the first and second pulleys (32) and (33) are set such that a gear ratio can provide 1:1. That is, the two pulleys (32) and (33) are the same in the winding diameter.

The size of the tensile force is set such that the value of the maximum main stress generated in the interior portion of the link (11) is equal to or more the elastic limit of the link (11) as well as equal to or less than the plastic limit thereof. Owing to this, a proper residual compression stress can be applied to the interior portion of the link (11), thereby being able to enhance the life of the link (11).

The peripheral length measuring apparatus (41), as shown in FIG. 9, includes a pair of sensors (42) and (43) disposed to face the linear shaped portion of the chain (1) so as to be spaced by a given distance L from each other, a projection (44) serving as a portion to be detected disposed on a given portion of the chain (1) corresponding to sensors (42) and (43), and a processor (45) for processing the outputs of the sensors (42) and (43).

Figure 10:
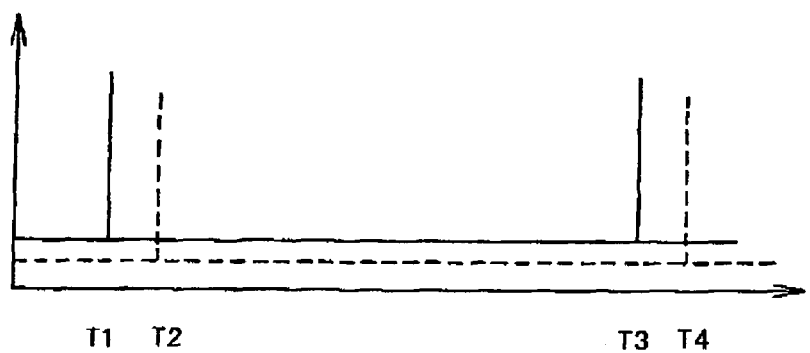
FIG. 10 is a view of a signal.
Figure 11:
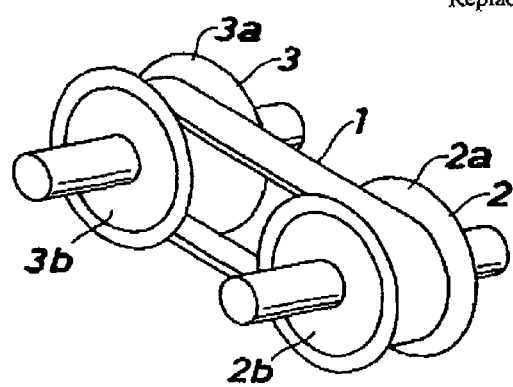
FIG. 11 is a perspective view of a continuously variable transmission.

The sensors (42) and (43) respectively output signals each time the portion to be detected (44) passes therethrough. Specifically, as shown in FIG. 10, the first sensor (42) detects the portion to be detected (44) at times T1 and T3, whereas the second sensor (43) detects the portion to be detected (44) at times T2 and T4 which are a little slower than the times T1 and T3, respectively. (T2−T1) or (T4−T3) corresponds to the time for the chain (1) to advance a distance L, whereas (T3−T1) or (T4−T2) corresponds to the time for the chain (1) to go around the pulleys.

The processor (45) includes a first operating unit for obtaining the time Ta for the portion to be detected (44) to move by the distance L, a second operating unit for obtaining the time Tb for the portion to be detected (44) to go round the pulleys, and a third operating unit for obtaining a chain peripheral length C according to an equation, C=L×Tb/Ta.

Ta can be obtained according to Ta=T2−T1, whereas Tb can be obtained according to Tb=T3−T1.

The measurement of the chain peripheral length is made after a pre-tension is applied to the chain (1). Owing to this, the actual length of the chain (1) can be measured simply and with high precision.

Here, in the second embodiment, there is illustrated an example in which the chain peripheral length is measured using the chain (1) shown in FIG. 3B. However, the peripheral length measuring apparatus (41) is also similarly able to measure the actual lengths of other winding members including the chain (1) shown in FIG. 3A and belts simply and with high precision.

Also, the projection (44) serving as the portion to be detected used in the peripheral length measuring apparatus (41) can be obtained, for example, by bonding it to the chain (1) in each measurement. However, since the number of links arranged in the chain advancing direction is known, by detecting the links (11) or clearances between the links using the respective sensors (42) and (43), the above-mentioned Ta and Tb can be obtained without separately providing the portion to be detected (44) such as a projection or the like.

INDUSTRIAL APPLICABILITY

According to the invention, it is possible to provide a winding member manufacturing method and a winding member manufacturing apparatus in which, since the mutually opposed sheave surfaces of the respective pre-tension applying pulleys are formed to have a concave shape corresponding to the projection-shaped curved portion of the end face of a pin, even when there is applied a pre-tension larger than a pre-tension applied in a continuously variable transmission to which the apparatus is actually applied, the end face of the pin can prevented against damage. This can enhance the durability of a chain which is manufactured using such method and apparatus.

According to the invention, it is possible to provide a continuously variable transmission winding member peripheral length measuring apparatus which can determine simply and highly accurately the peripheral length of a winding member such as a chain and a belt for use in a continuously variable transmission. Additional provision of such peripheral length measuring apparatus makes it possible to obtain the peripheral length of the winding member without carrying out a peripheral length measuring step separately.

The invention claimed is:

1. A method for manufacturing a winding member provided with a plurality of links and a plurality of pins for connecting the links and wound around two pulleys of a continuously variable transmission, the method comprising:
    winding an endless shaped chain around a first pre-tension applying pulley of a pre-tension applying apparatus and a second pre-tension applying pulley of the pre-tension applying apparatus;

applying a pre-tension to the chain; and removing the chain from the first and second pre-tension pulleys and subsequently winding the chain around the two pulleys of the continuously variable transmission, wherein each of sheave surfaces, which are mutually opposed to each other, of the first and second pre-tension applying pulleys has a concave curved portion, wherein an end face of each of the pins has a convex curved portion, wherein the concave curved portion of each of the sheave surfaces corresponds to the convex curved portion of the end face of each of the pins, and wherein a winding diameter of one of the first and second pre-tension applying pulleys of the pre-tension applying apparatus is less than a minimum winding diameter of the two pulleys of the continuously variable transmission.

2. A winding member manufacturing method as set forth in claim 1, wherein a radius of curvature R of the concave curved portion of each of the sheave surfaces is set such that 0.8r≤R≤5r, where r expresses a radius of curvature of the convex curved portion of the end face of each of the pins.

3. A winding member manufacturing method as set forth in claim 1, wherein a radius of curvature R of the concave curved portion of the sheave surfaces is set such that r≤R≤2r, where r expresses a radius of curvature of the convex curved portion of the end face of each of the pins.

4. A winding member manufacturing method as set forth in claim 1, wherein a radius of curvature R of the concave curved portion of the sheave surfaces is equal to a radius of curvature of the convex curved portion of the end face of each of the pins.

5. A winding member manufacturing method as set forth in claim 1, wherein the sheave surfaces of the first and second pre-tension applying pulleys are fixed relative to one another in an axial direction of each of the first and second pre-tension applying pulleys, respectively.

6. A winding member manufacturing method as set forth in claim 1, wherein the applying the pre-tension to the chain is performed so as to impart a residual compression stress to a link of the plurality of links.

7. A winding member manufacturing method as set forth in claim 1, wherein the applying the pre-tension to the chain includes increasing a distance between the first pre-tension applying pulley the second pre-tension applying pulley.

8. A winding member manufacturing method as set forth in claim 1, wherein the applying the pre-tension to the chain includes applying a tension which is in a range of an elastic limit value of a link of the plurality of links to a plastic limit value of the link.

9. A winding member manufacturing method as set forth in claim 1, wherein the applying the pre-tension to the chain includes applying a tension which is greater than a tensile force experienced during normal operation of the winding member.

10. A winding member manufacturing method as set forth in claim 1, wherein the sheave surfaces of the first pre-tension applying pulley are fixed relative to each other in an axial direction.

11. A winding member manufacturing method as set forth in claim 1, wherein the sheave surfaces of each of the first and second pre-tension applying pulleys are fixed relative to each other in an axial direction.

12. A winding member manufacturing method as set forth in claim 1, wherein the sheave surfaces of the first and second pre-tension applying pulleys have shapes different from shapes of mutually opposed sheave surfaces of the two pulleys of the continuously variable transmission.

13. A winding member manufacturing method as set forth in claim 1, wherein the sheave surfaces of each of the first and second pre-tension applying pulleys are formed so as to have a same curvature as the convex curved portion of the end face of each of the pins.

14. An apparatus for manufacturing a winding member provided with a plurality of links and a plurality of pins for connecting the links and wound around two pulleys of a continuously variable transmission, the apparatus comprising:

a pre-tension applying apparatus including a first pre-tension applying pulley and a second pre-tension applying pulley around which an endless shaped chain is configured to be wound, wherein each of sheave surfaces, which are mutually opposed to each other, of the first and second pre-tension applying pulleys has a concave curved portion, wherein an end face of each of the pins has a convex curved portion, wherein the concave curved portion of each of the sheave surfaces corresponds to the convex curved portion of the end face of each of the pins, and wherein a winding diameter of one of the first and second pre-tension applying pulleys of the pre-tension applying apparatus is less than a minimum winding diameter of the two pulleys of the continuously variable transmission.

15. An apparatus as set forth in claim 14, wherein a radius of curvature R of the concave curved portion of each of the sheave surfaces is set such that 0.8r≤R≤5r, where r expresses a radius of curvature of the convex curved portion of the end face of each of the pins.

16. An apparatus as set forth in claim 14, wherein the sheave surfaces of the first and second pre-tension applying pulleys are fixed relative to one another in an axial direction of each of the first and second pre-tension applying pulleys, respectively.

17. An apparatus as set forth in claim 14, wherein the pretension applying apparatus applies a residual compression stress to a link of the plurality of links.

18. An apparatus for manufacturing a winding member provided with a plurality of links and a plurality of pins for connecting the links and wound around two pulleys, said apparatus comprising:

a pre-tension applying apparatus including a first pre-tension applying pulley and a second pre-tension applying pulley around which an endless shaped chain is configured to be wound; and a pulley moving device configured so as to move the first pre-tension applying pulley towards and away from the second pre-tension applying pulley, wherein each of sheave surfaces, which are mutually opposed to each other, of the first and second pre-tension applying pulleys includes a concave curved portion, wherein an end face of each of the pins includes a convex curved portion, wherein the concave curved portion of each of the sheave surfaces corresponds to the convex curved portion of the end face of each of the pins, and wherein a radius of curvature R of the concave curved portion of each of the sheave surfaces is set such that 0.8r≤R≤5r, where r expresses a radius of curvature of the convex curved portion of the end face of each of the pins.

19. An apparatus as set forth in claim 18, wherein the pulley moving device comprises a pulley shaft moving device which moves a pulley shaft of the first pre-tension pulley towards and away from the second pre-tension pulley.

* * * * *